US011276395B1

(12) United States Patent
Jones et al.

(10) Patent No.: US 11,276,395 B1
(45) Date of Patent: Mar. 15, 2022

(54) VOICE-BASED PARAMETER ASSIGNMENT FOR VOICE-CAPTURING DEVICES

(71) Applicant: Amazon Technologies, Inc., Seattle, WA (US)

(72) Inventors: Harrison Holmes Jones, Seattle, WA (US); Jonathan Alan Leblang, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 379 days.

(21) Appl. No.: 15/456,097

(22) Filed: Mar. 10, 2017

(51) Int. Cl.
| | |
|---|---|
| G10L 13/00 | (2006.01) |
| G10L 15/02 | (2006.01) |
| G10L 15/22 | (2006.01) |
| G10L 15/30 | (2013.01) |
| H04L 29/08 | (2006.01) |
| H04L 67/51 | (2022.01) |
| H04L 67/10 | (2022.01) |

(52) U.S. Cl.
CPC .............. *G10L 15/22* (2013.01); *G10L 13/00* (2013.01); *G10L 15/02* (2013.01); *G10L 15/30* (2013.01); *H04L 67/16* (2013.01); *G10L 2015/223* (2013.01); *H04L 67/10* (2013.01)

(58) Field of Classification Search
CPC ......... G10L 15/22; G10L 15/02; G10L 15/30; H04L 67/16
See application file for complete search history.

(56) References Cited

U.S. PATENT DOCUMENTS

| | | | | |
|---|---|---|---|---|
| 8,296,153 | B2 * | 10/2012 | Gazdzinski | G06Q 30/0251 704/275 |
| 8,515,843 | B1 | 8/2013 | Sah et al. | |
| 8,606,568 | B1 * | 12/2013 | Tickner | G10L 15/1815 704/231 |
| 8,645,143 | B2 * | 2/2014 | Mozer | 701/408 |
| 8,655,761 | B2 | 2/2014 | Sah et al. | |
| 9,355,555 | B2 | 5/2016 | Reichert et al. | |

(Continued)

FOREIGN PATENT DOCUMENTS

EP      2113909 B1 *   1/2015    ............. G06Q 10/06

OTHER PUBLICATIONS

Grant Clauser, "What Is Alexa? What Is the Amazon Echo, and Should You Get One?," The Wirecutter, Feb. 10, 2017, pp. 1-18.

*Primary Examiner* — Daniel C Washburn
*Assistant Examiner* — Oluwadamilola M Ogunbiyi
(74) *Attorney, Agent, or Firm* — Robert C. Kowert; Kowert, Hood, Munyon, Rankin & Goetzel, P.C.

(57) ABSTRACT

Methods, systems, and computer-readable media for voice-based parameter assignment for voice-capturing devices are disclosed. Voice input from a voice-capturing device is received over one or more networks at a service provider environment comprising one or more services. The services implement voice input analysis and device management. Using the voice input analysis, analysis of the voice input is performed to determine that the voice input represents a value for a configuration parameter. The value is descriptive of the device. An association between the voice-capturing device and the value for the configuration parameter is stored using the device management. The value affects one or more actions taken by the service provider environment responsive to further voice input from the voice-capturing device.

20 Claims, 9 Drawing Sheets

(56) References Cited

U.S. PATENT DOCUMENTS

| | | | |
|---|---|---|---|
| 9,520,250 B2 | 12/2016 | O'Keeffe | |
| 9,536,527 B1* | 1/2017 | Carlson | G10L 15/30 |
| 10,019,068 B2* | 7/2018 | Koo | G06F 3/01 |
| 10,121,474 B2* | 11/2018 | Yu | G06F 3/04842 |
| 2002/0160766 A1* | 10/2002 | Portman | G06Q 10/06 455/422.1 |
| 2002/0161587 A1* | 10/2002 | Pitts, III | G06Q 10/06 704/276 |
| 2003/0234807 A1* | 12/2003 | Onbe | G10L 15/26 715/734 |
| 2005/0096906 A1* | 5/2005 | Barzilay | G06Q 30/06 704/249 |
| 2005/0165607 A1* | 7/2005 | Di Fabbrizio | G06F 17/2785 704/256 |
| 2005/0190052 A1* | 9/2005 | Bissett | G08B 5/002 340/500 |
| 2008/0275699 A1* | 11/2008 | Mozer | 704/231 |
| 2009/0198495 A1* | 8/2009 | Hata | H04M 3/565 704/246 |
| 2010/0094707 A1* | 4/2010 | Freer | G06Q 30/02 705/14.54 |
| 2014/0004826 A1* | 1/2014 | Addy | H04W 12/06 455/411 |
| 2014/0039888 A1* | 2/2014 | Taubman | H04M 1/72457 704/235 |
| 2015/0019228 A1* | 1/2015 | Akolkar | G06F 16/3344 704/270.1 |
| 2015/0046168 A1* | 2/2015 | Gandrabur | G10L 15/1822 704/275 |
| 2016/0036764 A1* | 2/2016 | Dong | H04L 61/3025 370/254 |
| 2016/0042733 A1* | 2/2016 | Yuan | H04W 4/021 704/243 |
| 2016/0088438 A1 | 5/2016 | O'Keeffe | |
| 2016/0125880 A1* | 5/2016 | Zhang | G06F 3/167 704/275 |
| 2016/0179462 A1* | 6/2016 | Bjorkengren | G06F 3/167 704/275 |
| 2016/0180222 A1 | 6/2016 | Sierhuis et al. | |
| 2016/0284207 A1 | 9/2016 | Hou et al. | |
| 2016/0309246 A1 | 10/2016 | O'Keeffe | |
| 2016/0330042 A1* | 11/2016 | Andersen | H04L 12/282 |
| 2016/0351194 A1* | 12/2016 | Gao | G10L 15/26 |
| 2016/0366274 A1* | 12/2016 | Yang | H04M 3/2236 |
| 2017/0040018 A1 | 2/2017 | Tormey | |
| 2017/0055126 A1 | 2/2017 | O'Keeffe | |
| 2017/0069321 A1* | 3/2017 | Toiyama | G10L 17/06 |
| 2017/0070478 A1* | 3/2017 | Park | H04L 67/12 |
| 2017/0125037 A1* | 5/2017 | Shin | G10L 25/21 |
| 2017/0133015 A1* | 5/2017 | Tomsa | G10L 15/26 |
| 2017/0154176 A1* | 6/2017 | Yun | G10L 15/22 |
| 2017/0193999 A1* | 7/2017 | Aleksic | G10L 15/197 |
| 2017/0279957 A1* | 9/2017 | Abramson et al. | H04M 1/72577 |
| 2017/0365251 A1* | 12/2017 | Park | G10L 15/14 |
| 2018/0005624 A1* | 1/2018 | Shi | G10L 15/22 |
| 2018/0018973 A1* | 1/2018 | Moreno | G10L 17/18 |
| 2018/0113673 A1* | 4/2018 | Sheynblat | G10L 17/00 |
| 2018/0122378 A1* | 5/2018 | Mixter | G10L 15/22 |
| 2018/0144743 A1* | 5/2018 | Aggarwal | G10L 15/22 |
| 2018/0190274 A1* | 7/2018 | Kirazci | G10L 15/1815 |
| 2018/0228006 A1* | 8/2018 | Baker | G10L 15/22 |
| 2018/0233147 A1* | 8/2018 | Tukka | G10L 15/30 |
| 2020/0068476 A1* | 2/2020 | Deluca | G10L 15/22 |
| 2020/0105267 A1* | 4/2020 | Singh | G10L 15/02 |
| 2020/0175980 A1* | 6/2020 | Li | G10L 15/30 |

* cited by examiner

VOICE-BASED PARAMETER ASSIGNMENT FOR VOICE-CAPTURING DEVICES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Such services may be said to reside "in the cloud." The types of devices that can access cloud-based services continue to expand and diversify, including, for example, desktop computing devices, mobile devices such as smartphones and tablets, voice-capturing devices, home automation devices, and various other types of network-capable devices that are part of the "Internet of Things (IoT)." By accessing cloud-based services, a diverse universe of devices may access additional functionality or computing power not available locally on the devices.

Figure 1:
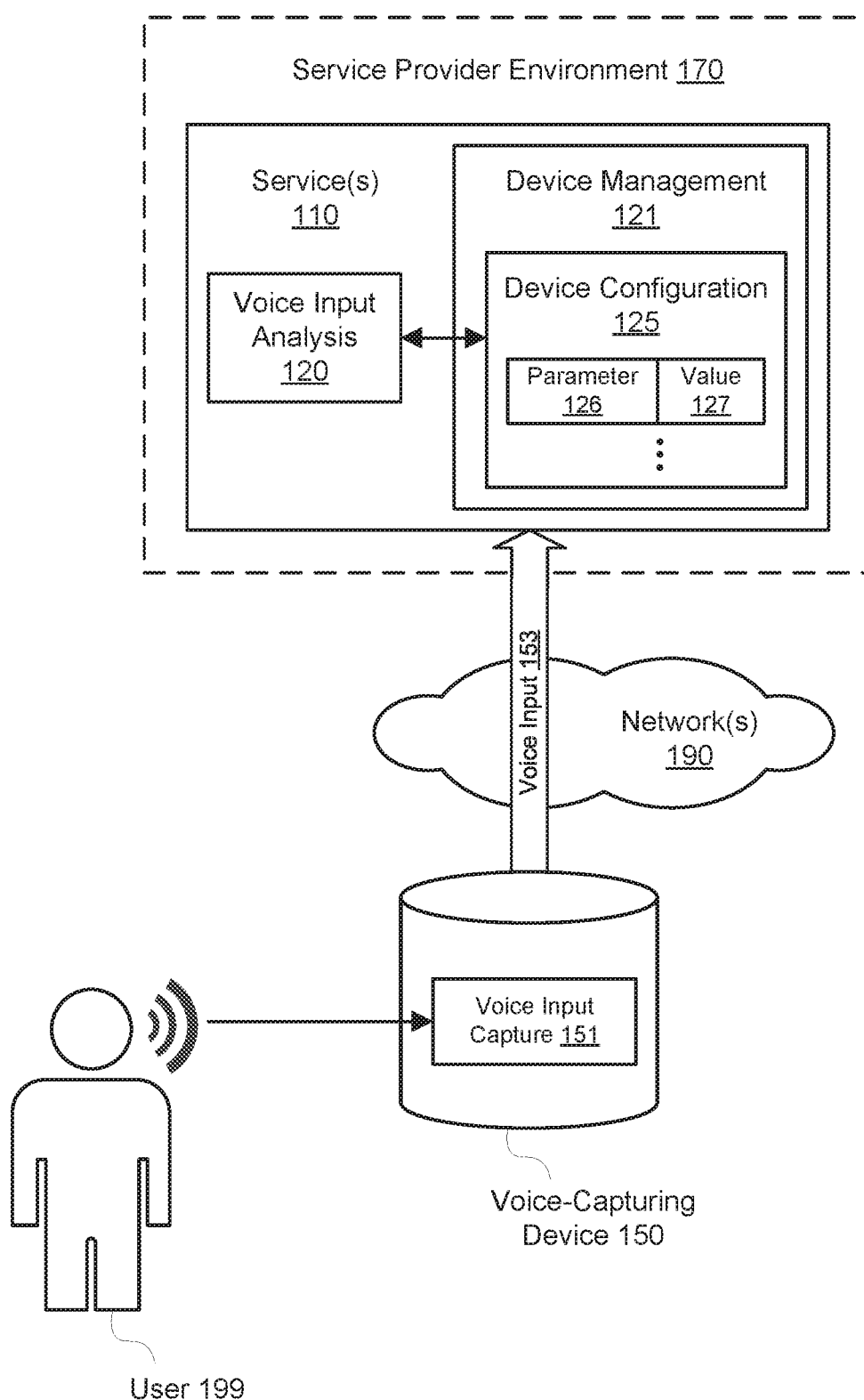
FIG. 1 illustrates an example system environment for voice-based parameter assignment for voice-capturing devices, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for voice-based parameter assignment for voice-capturing devices are disclosed. Using the techniques described herein, the value for a configuration parameter of a device may be established using voice input captured by the device and provided to a cloud-based service provider environment. The value may be descriptive of the device, e.g., the value may represent a particular location of the device, such as a room assignment within a building, a device-specific identifier, or a value for another suitable parameter. Suitable devices may include voice-capturing devices or smart speakers as well as other home automation and/or "Internet of Things" devices. The device may be configurable to access one or more services provided by the cloud-based service provider environment, such as one or more network-accessible voice-based services that respond to voice input streamed from one of the devices. The voice-based service(s) may receive voice input from a device, analyze it, determine that the voice input represents a value for a configuration parameter, and store (e.g., "in the cloud") an association between the device and the value. In analyzing the voice input, the voice-based service(s) may attempt to disambiguate the contents of the input and/or verify that the provided value is an authorized value for the particular configuration parameter. For example, the initial input may be deemed ambiguous if it is incomplete and maps to two different parameter values. The stored value may be retrieved and used for one or more additional actions. For example, one or more services in the service provider environment referred to as "skills" may use the value to perform actions that are dependent on or associated with the specific location of the device. A device management service may be used to make particular skills accessible to the device and to specify authorized values for device configuration parameters. As another example, an information skill may be used to generate voice output reciting the value for the configuration parameter (potentially along with other values for other parameters) responsive to a voice command requesting such information. Using the techniques described herein, a voice-capturing device may be configured easily and efficiently without the use of a graphical user interface (GUI) or conventional management console.

FIG. 1 illustrates an example system environment for voice-based parameter assignment for voice-capturing devices, according to one embodiment. A device such as device 150 may interact with one or more components of a service provider environment 170, e.g., to access additional functionality or computing resources not available locally on the device but instead provided (at least in part) by the service provider environment. The service provider environment 170 may provide functionality or computing resources to various types of devices outside the service provider environment, such as various types of electronic devices, digital devices, and/or computing devices. For example, the device 150 may represent a smart speaker, a smart television or other audiovisual component, a home automation device, and/or another type of device in the "Internet of Things (IoT)." In some embodiments, the device 150 may lack a graphical display capability (e.g., a display suitable for implementing a graphical user interface) and/or a physical input capability (e.g., a keyboard or touchscreen) that could otherwise enable a user to interact with the device for device configuration. In one embodiment, the device 150 may lack a global positioning system (GPS) sensor or other hardware that could otherwise enable geolocation of the device. In one embodiment, the device 150 may include a voice input capture functionality 151, including a microphone and/or other suitable voice-capturing or audio input component(s), usable to capture audio input 153 including speech. The device 150 may be referred to herein as a voice-capturing device or a voice-capturing endpoint and may include a voice interaction capability. Using the techniques described herein, audio captured using the voice input capture 151 may be used to determine a configuration of the device 150.

The device 150 may be authorized to access one or more resources and/or services provided by a cloud-based service provider environment 170. The service provider environment 170 may include various components that are owned or managed by one or more entities or organizations called service providers. In various embodiments, aspects of the service provider environment 170 may be provided as one or more publicly accessible services that are "in the cloud" relative to the device 150 or instead as one or more privately accessible services. The components of the service provider environment 170 may be located in one or more data centers and in one or more geographical locations. The service provider environment 170 may include and/or offer a plurality of services, and the services may perform various functions or operations. In various embodiments, some of the services may be accessed by the device 150 while others of the services may be accessed only by other services and not directly by the device. The services may be implemented according to a service-oriented architecture (SOA) in which services exchange requests and responses to perform complex operations. In one embodiment, the services may include one or more network-accessible services 110. The device 150 may stream or otherwise send voice input 153 to the service(s) 110 provided by the service provider environment 170. In one embodiment, the voice capture may be prompted by detection of an audible "wake word" associated with the device 150, e.g., using the voice input capture 151 to monitor audio in the vicinity of the device while the device is powered on and appropriately configured. In one embodiment, the voice input capture 151 may be prompted by a button press, a gesture, or another suitable user interaction instead of a wake word. In one embodiment, after the wake word or other user-supplied prompt is detected, the voice input capture 151 may continue to record (and the device 150 may continue to stream) audio input 153 until a pause of suitable duration is detected; until the service(s) 110 instruct the device to stop; until a particular duration has been reached for the captured audio; or until a button press, gesture, or other suitable user interaction is received to end the voice capture.

The service(s) may be part of a voice interaction platform hosted in a cloud computing environment. The service(s) 110 may analyze the voice input 153 and take one or more actions responsive to the voice input, such as generating and sending voice output back to the originating device 150 for playback on the device. The actions and/or voice output may vary based on the resources and/or services of the service provider environment 170, also referred to herein as skills, that are accessible to the device 150. In various embodiments, the skills provided by the service provider environment 170 may include, for example, scheduling conference calls; identifying a speaker during a conference call; acting as a scheduling assistant; providing calendaring services, recording a meeting; accessing calendars, phone directories, or e-mail; creating, scheduling, and/or modifying tasks; ordering items or food; requesting assistance, such as room service or a taxi; and so on. In one embodiment, the particular skills accessible to the device 150 may vary and may be modified by an administrator or other user with suitable configuration privileges.

In one embodiment, the service(s) 110 may include a device management service 121 that is usable to determine or modify aspects of the device configuration 125 associated with the device 150. The device management service 121 may include or represent a management console for at least some of the functionality of the service provider environment 170. In one embodiment, the device management service 121 may be used to make particular skills accessible to the device, e.g., based on user input or input through an application programming interface (API). For example, user input to the device management service 121 may identify a set of skills that a particular device or class of devices can access, e.g., as selected from a predetermined list of skills provided by the service provider environment 170. In one embodiment, the device management service 121 may be used to specify authorized or permissible values for device configuration parameters, e.g., based on user input or input through an API. The authorized values may include a set of values, including the value 127. For example, the authorized values for a location parameter may include a set of named locations, such as rooms within one or more buildings, as provided by a client of the service provider environment 170. The skills that the device 150 may be authorized to perform may be dependent upon the parameters associated with the device 150, such as configuration parameters like a location parameter (e.g., a particular room in a building). In various embodiments, all or part of the device configuration 125 may be stored remotely in the service provider environment 170 and/or in storage locally accessible to the device 150 itself. For example, a full configuration profile may be stored by the device management service 121, while a more limited set of configuration parameters may be stored on the device 150.

In one embodiment, the voice input 153 may represent speech input from a user 199. The speech may include natural language speech. The voice input 153 may represent digital audio in any suitable format. The voice input 153 may be streamed or otherwise sent from the device 150 to the service(s) 110. The service(s) 110 may include a component (or multiple components) for voice input analysis 120. In one embodiment, for example, the voice input analysis 120 may be provided in a voice-based service that implements a voice-based interface for devices, while the device management 121 may be provided by a different service targeted to device management for businesses, educational institutions, and/or residences. Using the voice input analysis 120, the service(s) 110 may decode the voice input 153 to determine one or more terms that are present in the audio. In one embodiment, one or more of the terms may represent commands to invoke functions (e.g., skills) provided by the service provider environment 170. In one embodiment, one or more of the terms may represent data usable by functions (e.g., skills) provided by the service provider environment 170. In one embodiment, the same voice input 153 may include both an invocation of a skill (or other function) and also arguments or other data usable by that skill or function.

In one embodiment, the voice input 153 may represent a value 127 for a configuration parameter 126 that is descriptive of some aspect of the device 150. For example, the parameter 126 may represent a device location, a device identifier, a device owner, an authorized device user, and/or other suitable device-related metadata or configuration parameters. For example, user 199 may issue a spoken command to the device 150 to set the value for the configuration parameter. In various embodiments, the spoken command may precede the voice input 153 or may be part of the same voice input that includes the value for the parameter. For example, in conjunction with a spoken command such as "set the location . . . " or "add this device to . . . ," the voice input analysis 120 may determine that any terms following the command may represent the location of the device. As another example, in conjunction with a spoken command such as "set the corporate asset number . . . ," the voice input analysis 120 may determine that any terms following the command may represent a corporate asset number associated with the device. In one embodiment, the user may be prompted to supply the value 127 for the parameter 126 after attempting to invoke another service whose functionality is dependent on or associated with that value. For example, if the user issues a command to schedule a conference, and the skill for conference scheduling requires a location for the device, then the service(s) may cause the device 150 to ask for the value 127 for the location parameter.

The voice input analysis 120 may verify that the user-supplied value for the parameter is a permissible value, e.g., by comparing the user-supplied value to a set of permissible values. The service(s) 110 may store the value 127 for the parameter 126 in a device configuration 125 associated with the device 150. The device configuration 125 may be associated with a device identifier, such as a serial number of the device 150. The device configuration 125 may be associated with an organization that owns or operates the device. The device configuration 125 may also include additional parameters and their corresponding values. The device configuration 125 may indicate a set of one or more services called "skills" that are accessible to the device 150 in the service provider environment 170. As will be discussed in greater detail below, the service-provider environment 170 may perform one or more additional tasks based (at least in part) on the stored parameter value 127, e.g., when the user 199 has invoked a skill that is dependent on or associated with the value.

Devices such as smart speakers may lack externally identifying features. Accordingly, if the parameter values are set for a batch of devices at once, and the values differ from device to device, then it may be difficult to determine which device has been assigned which parameter value. For example, if differing location parameters are set for a group of devices while located in a common administrative area, the administrator may need to physically mark the individual devices with their intended destinations in order for the devices to be deployed correctly. Using the techniques described herein, a device may be deployed to a particular location such as a conference room, and its individual device configuration (e.g., its location) may be set by voice command after the device has been moved to that location. In turn, the particular skills available to that device may be based at least in part on its location. In one embodiment, a device configuration (e.g., its location) may be set without the use of a graphical user interface, command-line interface, or similar form of management console.

In one embodiment, a configuration parameter may be set by any user. In one embodiment, a configuration parameter may be set by any user only if the parameter has not already been set. In one embodiment, a configuration parameter may be set for a device 150 only if the user 199 has sufficient privileges to do so with respect to that device. The authorization (or lack thereof) of the user 199 to perform the configuration change may be determined in any suitable manner. For example, voice identification against a known voice profile may be used to verify the identity of the user 199. As another example, other biometric authentication of the user 199, such as fingerprint identification, may be performed using the device 150 to verify the identity of the user. As a further example, the user may be authorized based (at least in part) on the presence of a previously authorized smartphone or other mobile device as a beacon in the vicinity of the device 150, e.g., on the same wireless network or with a direct Bluetooth connection. As yet another example, the user 199 may be asked to speak a password or PIN code in order to perform the configuration setting.

The device 150 may communicate with the service(s) 110 (or other components of the service provider environment 170) over one or more networks 190, e.g., by conveying network-based service requests to the service provider environment via the network(s). In one embodiment, the network(s) 190 may include one or more wireless networks, such as one or more Wi-Fi networks or other types of wireless local area networks (WLANs). The wireless network(s) may be implemented using any suitable wireless communication technologies and any suitable configuration of networking components, such as one or more wireless routers. In one embodiment, the device 150 may include a wireless networking interface for accessing Wi-Fi and/or other suitable wireless networks. In one embodiment, the network(s) 190 may include communicate via one or more wired networks, such as one or more wired networks over a transmission medium such as Ethernet. In one embodiment, the device 150 may include a wired networking interface for accessing suitable wired networks. In various embodiments, the network(s) 190 may encompass any suitable combination of networking hardware and protocols necessary to establish network-based communications between the device 150 and service(s) 110. For example, the network(s)

190 may generally encompass the various telecommunications networks and service providers that collectively implement the Internet. The network(s) 190 may also include private networks such as local area networks (LANs) or wide area networks (WANs) as well as public or private wireless networks. In one embodiment, the network(s) 190 may include the hardware (e.g., modems, routers, switches, load balancers, proxy servers, etc.) and software (e.g., protocol stacks, accounting software, firewall/security software, etc.) necessary to establish a networking link between two particular components. In one embodiments, the device 150 may be able to communicate with the service(s) 110 using a private network rather than the public Internet. In one embodiment, the device 150 may represent a satellite device that connects to a central device over a local area network (wired or wireless) or direct connection (wired or wireless, e.g., Bluetooth), e.g., to stream voice input to the central device, and the central device may then stream the voice input to the service provider environment 170.

In one embodiment, the functionality of the service(s) 110 of the service provider environment 170 may be distributed across different physical sites. For example, a first portion of the functionality of the service(s) 110 may be implemented in one or more components that are located in the same local area network or physical site as the device 150, while a second portion of the functionality of the service(s) 110 may be implemented "in the cloud" and accessible to the first portion via a wide area network. The first portion may include enough computing resources to perform tasks such as voice input analysis as well as more frequently accessed services. All or part of the device configuration may be stored locally (in the first portion), in the cloud (the second portion), or in both portions. Using this distribution of the service(s) to localize more of the processing, network usage may be minimized between a local site (including the device 150) and the cloud-based portion of the service provider environment 170. Such a distribution of service(s) may be especially beneficial if the device 150 is located in a remote area having restricted network access.

Figure 9:
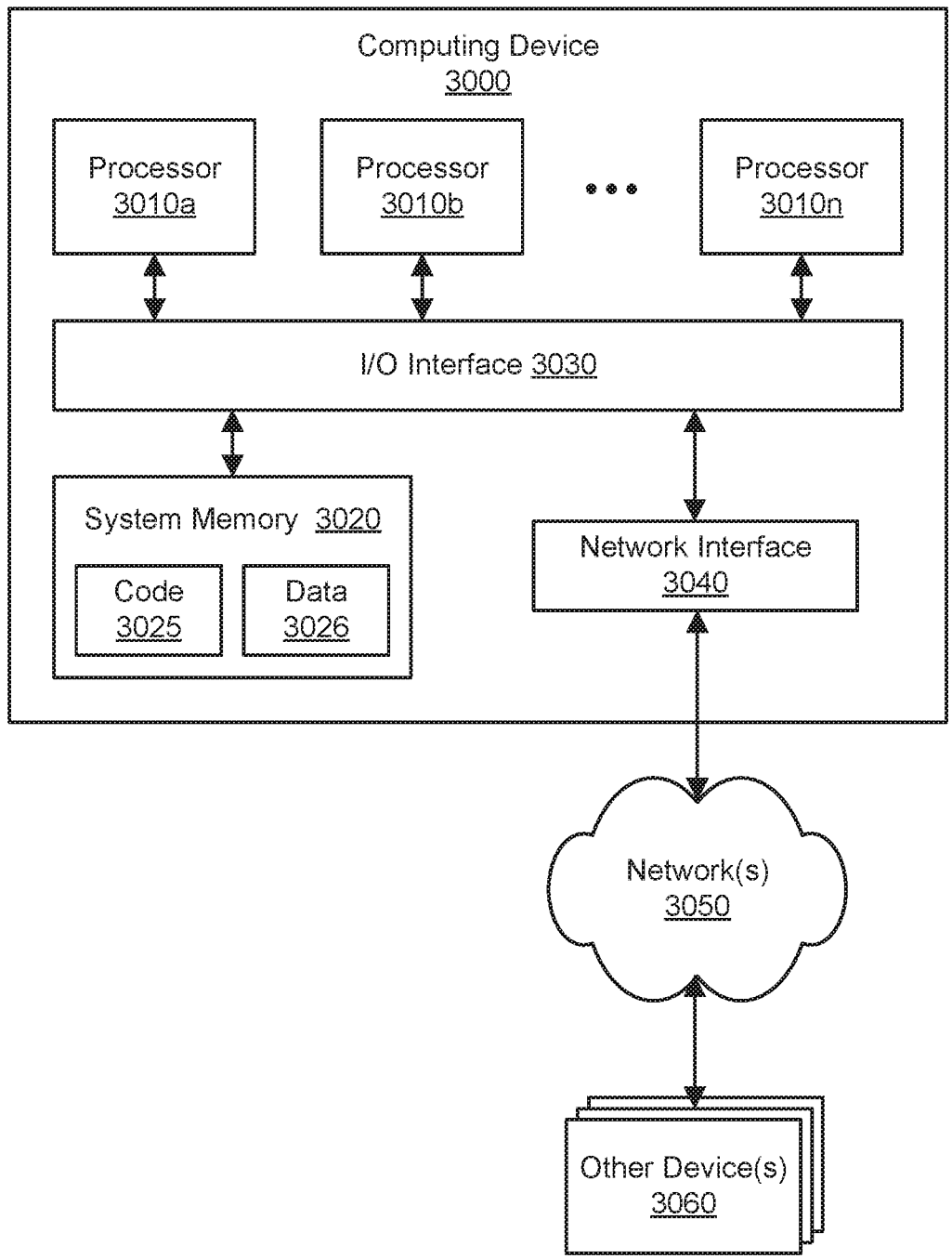
FIG. 9 illustrates an example computing device that may be used in some embodiments.

The device 150 may be implemented by the example computing device 3000 illustrated in FIG. 9. The service provider environment 170 may include a plurality of computing devices, any of which may be implemented by the example computing device 3000 illustrated in FIG. 9. In various embodiments, portions of the described functionality of the service(s) 110 may be provided by the same computing device or by any suitable number of different computing devices. If any of the components of the service(s) 110 are implemented using different computing devices, then the components and their respective computing devices may be communicatively coupled, e.g., via one or more networks. Each of the illustrated components may represent any combination of software and hardware usable to perform their respective functions. It is contemplated that the device 150, service provider environment 170, and networking infrastructure 190 may include additional components not shown, fewer components than shown, or different combinations, configurations, or quantities of the components shown.

Figure 2:
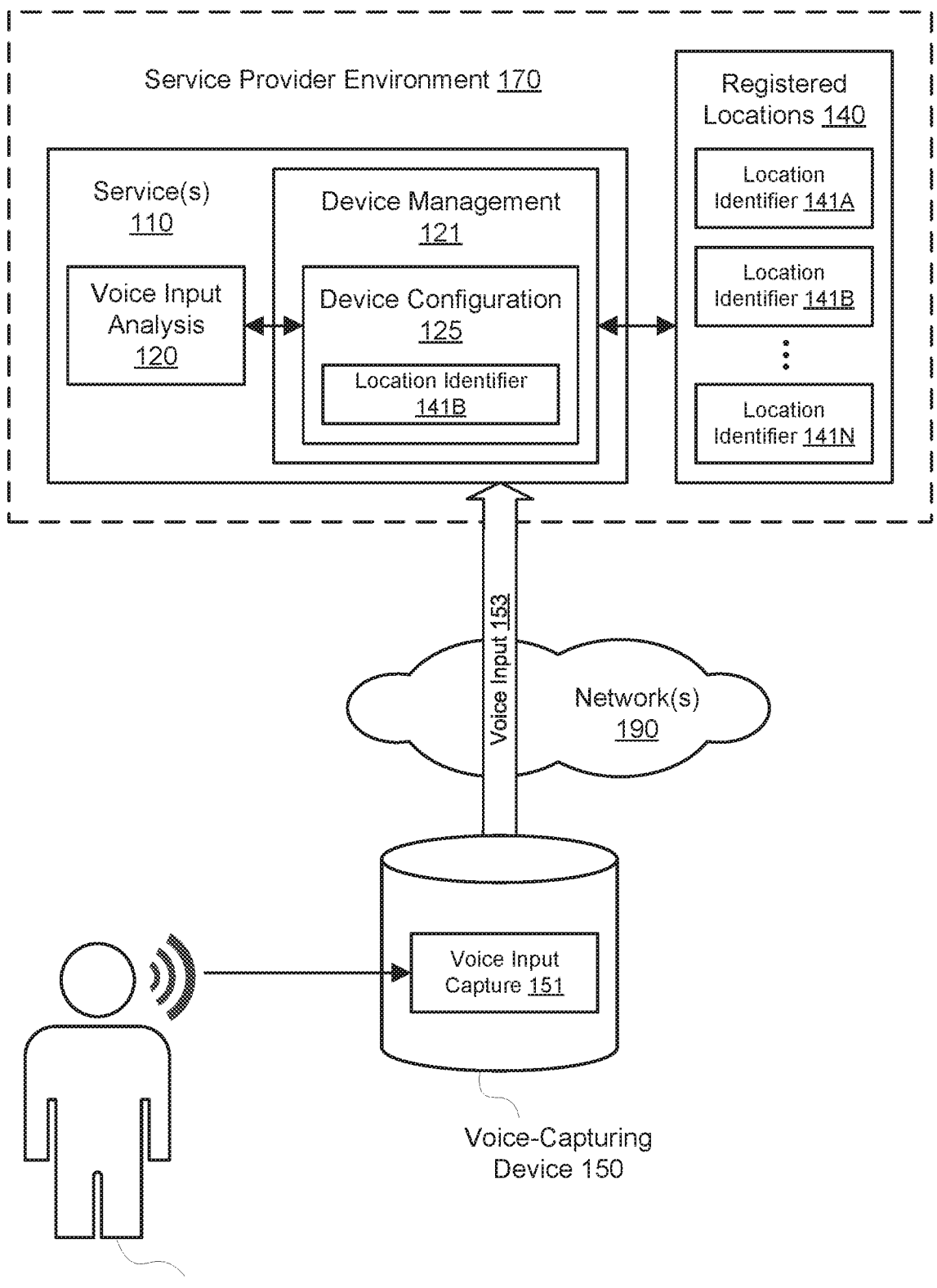
FIG. 2 illustrates further aspects of the example system environment for voice-based parameter assignment for voice-capturing devices, including assigning a location identifier selected from a set of registered locations, according to one embodiment.

FIG. 2 illustrates further aspects of the example system environment for voice-based parameter assignment for voice-capturing devices, including assigning a location identifier selected from a set of registered locations, according to one embodiment. In one embodiment, the parameter 126 may represent a location of the device 150, and the value 127 may represent an identifier of a particular location. For example, the value 127 may represent a particular room in a building or on a campus that includes multiple rooms. As another example, the value 127 may represent a particular conference room, office, or other space within a particular office building. As a further example, the value 127 may represent a particular room or area within a particular residence. As yet another example, the value 127 may represent a particular hotel room within a particular hotel. The voice input analysis 120 may compare a user-supplied value in the voice input 153 to a set of registered locations 140 representing permissible values for the location parameter. The registered locations 140 may be determined, updated, and/or otherwise configured by an administrator associated with the service provider environment 170, e.g., using a console of the device management service or component 121. The registered locations 140 may include any suitable number and configuration of discrete location identifiers. In one embodiment, the location identifiers 141A-141N may include nicknames or alternative names for the same location. As shown in the example of FIG. 2, the registered locations 140 may include a set of location identifiers such as identifiers 141A and 141B through 141N. As also shown in the example of FIG. 2, the location identifier 141B from the set of registered locations 140 may be selected as the value 127 of the parameter 126 for the device 150, based (at least in part) on the contents of the voice input 153.

In one embodiment, the location identifier supplied by the user 199 in the voice input 153 may not be an exact match for any of the identifiers 141A-141N. For example, the user-supplied value may represent only a portion of a permissible value, may represent a nickname or alternative name for a permissible value, or may map to two or more of the identifiers 141A-141N. In some circumstances, the service(s) 110 may select the value 127 from a list of permissible values for the parameter 126 by making the closest match to the user-supplied value, e.g., when the user-supplied value represents an alternative name of a location or a sufficiently large portion of a permissible value. In one embodiment, the service(s) 110 may take any other suitable steps to resolve or disambiguate an ambiguous user-supplied value 127 for the parameter 126, such as by asking the user 199 for additional voice input to clarify the value.

Figure 3:
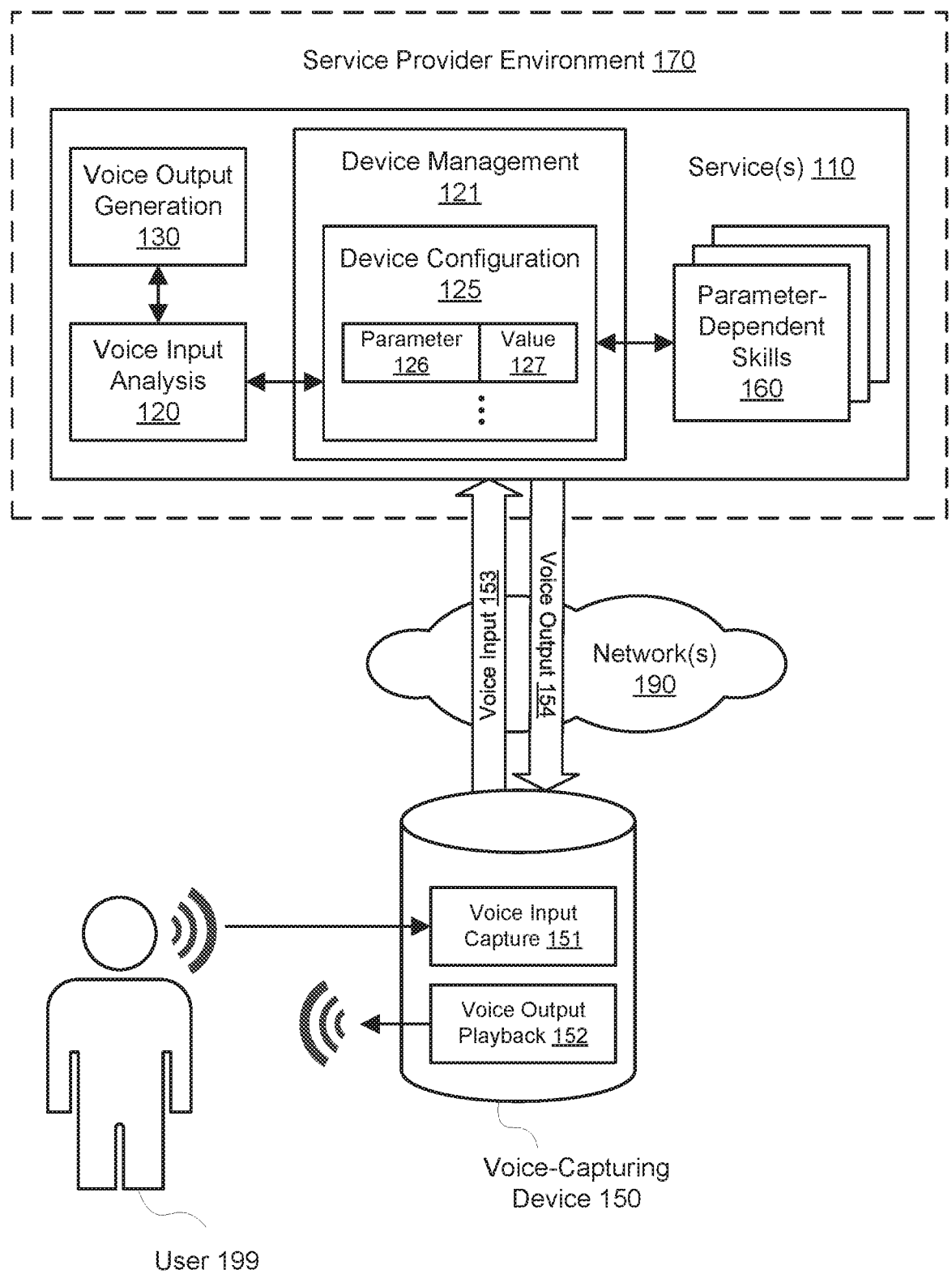
FIG. 3 illustrates further aspects of the example system environment for voice-based parameter assignment for voice-capturing devices, including use of the assigned parameter value by one or more parameter-dependent skills, according to one embodiment.

FIG. 3 illustrates further aspects of the example system environment for voice-based parameter assignment for voice-capturing devices, including use of the assigned parameter value by one or more parameter-dependent skills, according to one embodiment. The service-provider environment 170 may perform one or more additional tasks based (at least in part) on the stored parameter value 127, e.g., when the user 199 has invoked a skill that is dependent on or associated with the value. As shown in the example of FIG. 3, the service provider environment 170 may include a set of parameter-dependent services called skills 160. As discussed above, the service provider environment 170 may include skills for scheduling conference calls; acting as a scheduling assistant; providing calendaring services; accessing calendars, phone directories, or e-mail; creating, scheduling, and/or modifying tasks; ordering items or food; requesting assistance, such as room service or a taxi; and so on. Based (at least in part) on user input to the device management service or component 121, the device 150 may be associated with one or more of these skills 160, e.g., as selected from a list of predetermined skills. In one embodiment, after the service(s) 110 set a location value for a device, the service(s) may determine which skills are available for that location and then enable those skills for the device. In one embodiment, an administrator or other user may associate the device 150 with a particular configuration profile, and the profile may be associated with a set of one or more skills 160 that are accessible to any device having that profile. Suitable ones of these skills may be performed using or responsive to the particular value 127 for the parameter 126. For example, a skill for joining a conference call may be performed based (at least in part) on the location of the device 150, e.g., by also determining any conference calls scheduled for the location. As another example, if the user 199 invokes a room service skill in a hotel, the room service skill may generate an instruction to hotel staff that specifies the location of the device 150. Additionally, different skill sets may be authorized for different locations, e.g., such that skill sets for hotel rooms may vary according to the price of the room. As a further example, if the user 199 invokes a skill to turn on or off the lights, the skill may be performed based (at least in part) on the location of the device 150. Again, the skills may vary based on the location, e.g., such that some locations may offer dimming options or color options for lights while other locations may offer only a binary on/off for lights.

In one embodiment, the device 150 may include or have access to a voice output playback functionality 152, including a speaker and/or other suitable audio-generating component(s), usable to play back audio output including computer-generated speech. In various embodiments, the voice output playback 152 may be located on board the device 150 or instead located in another device, such as a remote control. The service(s) 110 may also include a component (or multiple components) for voice output generation 130. Using the voice output generation 130, the service(s) may generate audio output 154 representing computer-generated speech. The service(s) 110 may stream or otherwise send the voice output 154 to the device 150, and the device may play back the output for the user 199 using the voice output playback 152. The voice output 154 may represent an acknowledgement of some aspect of the voice input 153 (e.g., acknowledgement that the requested task was performed successfully), a response to a question or inquiry posed by the user 199, a request for more information from the user, or any other suitable audio-based interaction. In one embodiment, the service(s) 110 may analyze the voice input 153, set the value 126 for the parameter 127, and generate and stream voice output 154 back to the originating device 150 for playback on the device, where the voice output 154 includes an acknowledgement of successfully setting the value for the parameter. Based on the parameter-dependent skills 160, voice output 154 may be generated, streamed to the device 150, and played back using the voice output playback 152. For example, the voice output 154 may acknowledge the successful execution of the requested task and/or specify that the task was performed with reference to the specific value 127 for the parameter 126.

Figure 4:
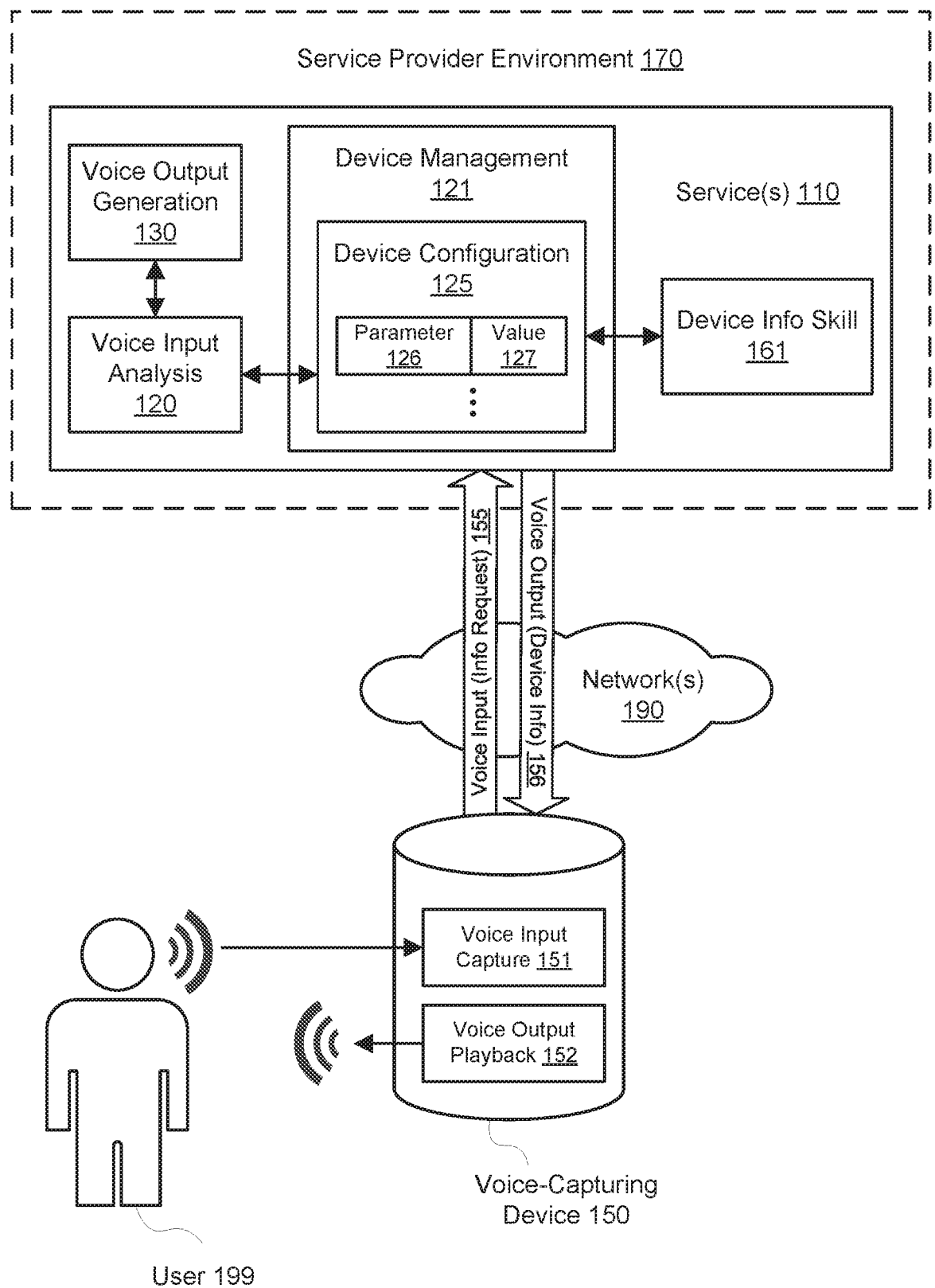
FIG. 4 illustrates further aspects of the example system environment for voice-based parameter assignment for voice-capturing devices, including use of the assigned parameter value by a device info skill, according to one embodiment.

FIG. 4 illustrates further aspects of the example system environment for voice-based parameter assignment for voice-capturing devices, including use of the assigned parameter value by a device info skill, according to one embodiment. As discussed above, the service-provider environment 170 may perform one or more additional tasks based (at least in part) on the stored parameter value 127, e.g., when the user 199 has invoked a skill that is dependent on or associated with the value. As shown in the example of FIG. 4, the service provider environment 170 may include a device info (information) skill 161 that is dependent on or associated with the parameter 126. The device info skill 161 may be made accessible to the device 150 by user input to the device management 121 that results in a stored association between the device and the info skill in the device configuration 125. The device info skill 161 may be invoked based (at least in part) on voice input analysis 120 determining that voice input 155 represents a request for the info skill, e.g., by determining that the voice input 155 includes one or more terms suitable to invoke the skill. The device info skill 161 may retrieve information associated with the device 150, including one or more parameter values in the stored device configuration 125, and generate (potentially in conjunction with the voice output generation 130) voice output 156 representing a recitation of device information. For example, the voice output 156 may include a recitation of the value 127 for the parameter 126. In one embodiment, the voice output 156 may include a recitation of multiple values corresponding to multiple parameters in the device configuration 125. In various embodiments, the request in the voice input 155 may represent a request only for a particular parameter value (e.g., the value 127 for the parameter 126) or may instead represent a request for a larger set of configuration information. In various embodiments, the set of configuration information regarding the device 150 that can be recited using the info skill 161 may include a device location, a device serial number or other identifier, a media access control (MAC) address of the device, an Internet protocol (IP) address of the device, a wireless network name, a time zone associated with the device, names or descriptions of skills accessible to the device, accounts associated with the device, and/or other suitable parameter values.

Figure 5:
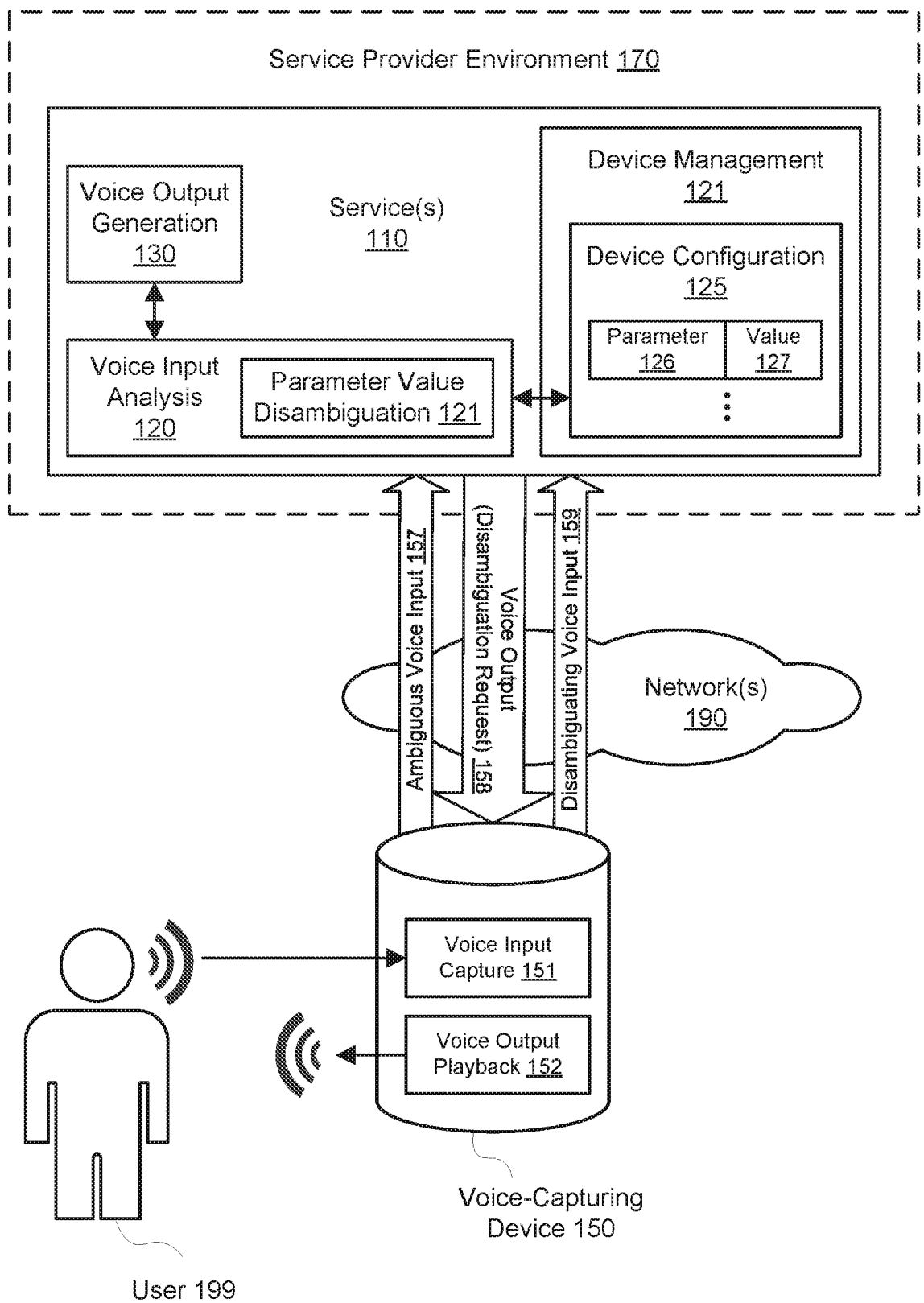
FIG. 5 illustrates further aspects of the example system environment for voice-based parameter assignment for voice-capturing devices, including disambiguation of a user-supplied value for a configuration parameter, according to one embodiment.

FIG. 5 illustrates further aspects of the example system environment for voice-based parameter assignment for voice-capturing devices, including disambiguation of a user-supplied value for a configuration parameter, according to one embodiment. As discussed above, a set of values representing permissible or approved values for the parameter 126 may be supplied by an administrator associated with the device 150. In one embodiment, the parameter value supplied by the user 199 in voice input 157 may not be an exact match for any of the permissible values for the corresponding parameter 126. For example, the user-supplied value may map to two or more of the permissible values or may map to none of the permissible values. In one embodiment, a parameter value disambiguation component 121 of voice input analysis 120 may take any suitable steps to resolve or disambiguate an ambiguous user-supplied value for the parameter 126 in the ambiguous voice input 157. In one embodiment, the parameter value disambiguation component 121 may include generating (potentially in conjunction with the voice output generation 130) and streaming voice output 158 representing a disambiguation request. The disambiguation request may include computer-generated speech soliciting additional information from the user 199, such as by asking the user for additional voice input to clarify the parameter value. If the ambiguous voice input 157 maps to two or more permissible values, then the disambiguation request may recite the two or more permissible values and ask the user 199 to select one of them. In response, the user 199 may supply additional, disambiguating voice input 159 representing a selection or recitation of a value for the parameter 126. In some cases, additional disambiguation may be performed until a permissible value 127 is determined for the parameter 126 or until a maximum number of disambiguation attempts has been reached. In some embodiments, various types of input other than voice input may be used for disambiguation. For example, additional input for disambiguation of device location may be acquired such as a location of a device in a network topology, radio frequency signals associated with the device, verification of the identity of the speaker, and so on.

Figure 6:
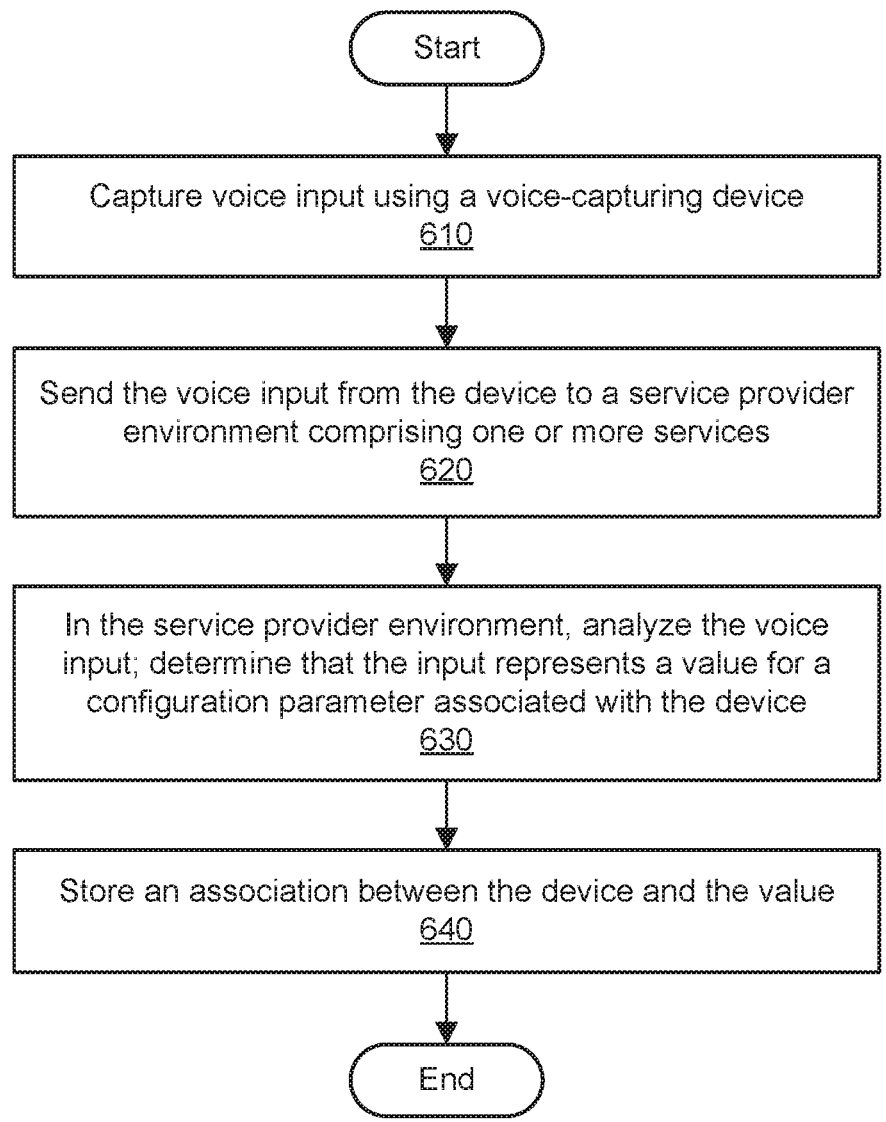
FIG. 6 is a flowchart illustrating a method for voice-based parameter assignment for voice-capturing devices, according to one embodiment.

FIG. 6 is a flowchart illustrating a method for voice-based parameter assignment for voice-capturing devices, according to one embodiment. As shown in 610, voice input may be captured using a voice-capturing device with a voice interaction capability. The device may represent a smart speaker, a smart television or other audiovisual component, a home automation device, and/or another type of device in the "Internet of Things (IoT)." In some embodiments, the device may lack a graphical display capability (e.g., a display suitable for implementing a graphical user interface) and/or a physical input capability (e.g., a keyboard or touchscreen) that could be otherwise enable a user to interact with the device for device configuration. In one embodiment, the device may include a voice input capture functionality, including a microphone and/or other suitable voice-capturing or audio input component(s), usable to capture audio input including speech. In one embodiment, the device may include a voice output playback functionality, including a speaker and/or other suitable audio-generating or audio output component(s), usable to play back audio output including computer-generated speech.

As shown in 620, the voice input may be sent from the device to a service provider environment. The service provider environment may include one or more voice-based services. The voice-based service(s) may be part of a voice interaction platform hosted in a cloud computing environment. The device may send voice input to one or more voice-based services provided by the service provider environment 170. In one embodiment, the voice capture may be prompted by detection of an audible "wake word" associated with the device, e.g., using the voice input capture to monitor audio in the vicinity of the device while the device is powered on and appropriately configured, or potentially with another type of prompt such as a button press or gesture. In one embodiment, the device may be responsive to a special wake word or prompt that is usable to request device configuration tasks. In one embodiment, after the prompt is detected, the voice input capture may continue to record (and the device may continue to stream) audio input until a pause of suitable duration is detected, until the voice-based service(s) instruct the device to stop or pause, or until a particular duration has been reached for the captured audio.

As shown in 630, the voice input may be analyzed by one or more components of the service provider environment. The voice input analysis may decode the voice input to determine one or more terms that are present in the audio. In one embodiment, one or more of the terms may represent commands to invoke services or functions (e.g., skills) provided by the service provider environment. In one embodiment, one or more of the terms may represent data usable by services or functions (e.g., skills) provided by the service provider environment. In one embodiment, the voice input may include both an invocation of a skill (or other function) and also arguments or other data usable by that skill or function. The analysis may determine that the voice input represents a value for a configuration parameter. For example, the user of the device may issue a spoken command to the device to set the value for the configuration parameter. The spoken command may precede the voice input captured in 610 or be part of the same voice input that includes the value for the parameter. The voice input analysis may verify that the user-supplied value for the parameter is a permissible value, e.g., by comparing the user-supplied value to a set of permissible values. In one embodiment, the parameter may represent a location of the device, and the value may represent an identifier of a particular location.

As shown in 640, an association between the device and the value may be stored. The association may be stored in a device configuration associated with the device and maintained in the service provider environment. The service(s) of the service provider environment may store the value for the parameter in a device configuration associated with the device. The parameter value may be stored "in the cloud" and/or on the device itself. The device configuration may also include additional parameters and their corresponding values. In one embodiment, the device configuration may also include one or more values configured by an administrator, such as a set of skills accessible to the device (or accessible to a device profile that is associated with the device). In one embodiment, the voice-based service(s) may set the value for the parameter and then generate and stream voice output back to the originating device for playback on the device, where the voice output includes an acknowledgement of successfully setting the value for the parameter. The service provider environment may perform one or more additional tasks based (at least in part) on the stored parameter value, e.g., when the user has invoked a skill that is dependent on or associated with the value.

Figure 7:
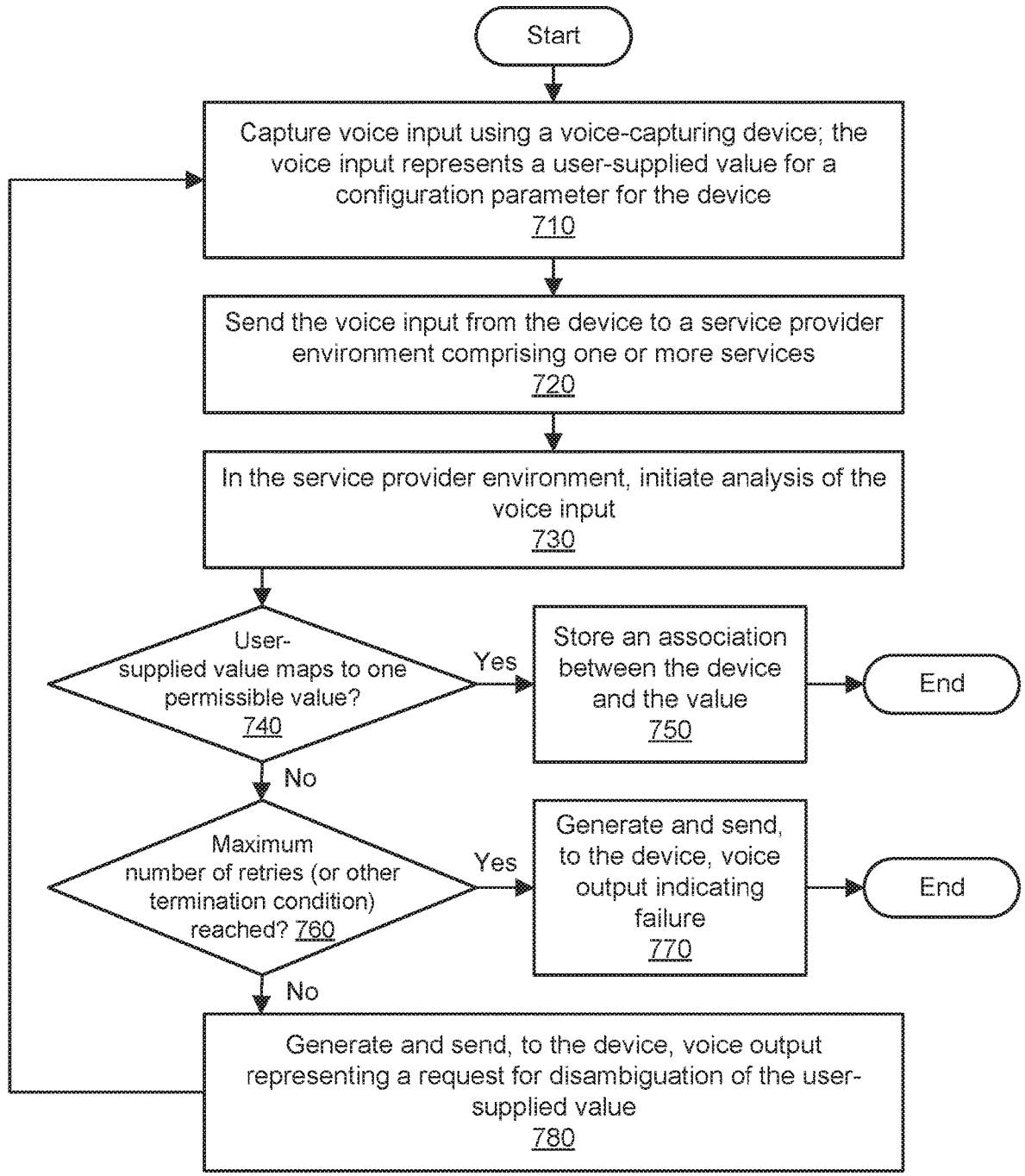
FIG. 7 is a flowchart illustrating further aspects of the method for voice-based parameter assignment for voice-capturing devices, including disambiguation of a user-supplied value for a configuration parameter, according to one embodiment.

FIG. 7 is a flowchart illustrating further aspects of the method for voice-based parameter assignment for voice-capturing devices, including disambiguation of a user-supplied value for a configuration parameter, according to one embodiment. As shown in 710, voice input may be captured using a voice-capturing device. The voice input may represent a user-supplied value for a configuration parameter. As shown in 720, the voice input may be sent from the device to a service provider environment that includes one or more voice-based services. The voice input may be captured and sent to the service provider environment in a similar manner as discussed above with respect to FIG. 6. As shown in 730, analysis of the voice input may be initiated by one or more components of the service provider environment. The voice input analysis may decode the voice input to determine one or more terms that are present in the audio. One of the terms in the decoded audio may represent the user-supplied value for the parameter. For example, in conjunction with a spoken command such as "set the location as . . . " or "add this device to . . . ," the voice input analysis may determine that any terms following the command may represent the location of the device.

A set of values that are approved for the parameter may be defined or specified, e.g., based on input from an administrator of an organization that owns or operates the device. For example, if the parameter relates to the location of the device, then the administrator may supply the names of potential locations, such as the names of conference rooms or other identified spaces in buildings. In one embodiment, the parameter value supplied by the user may not be an exact match for any of the permissible values for the corresponding parameter. For example, the user-supplied value may map to two or more of the permissible values or may map to none of the permissible values. As shown in 740, the analysis may determine whether the user-supplied value in the voice input maps to one permissible value. If the user-supplied value does map to one permissible value, then as shown in 750, an association between the device and the permissible value may be stored. The association may be stored in a device configuration associated with the device and maintained in the service provider environment in a similar manner as discussed above with respect to FIG. 6.

In one embodiment, disambiguation techniques may be used to determine whether the configuration request is authorized to be invoked by the particular user or whether the command is authorized to be invoked for the particular device. If the user-supplied value does not map to one permissible value, then as shown in 760, the method may determine whether a maximum number of retries or any other relevant termination condition has been reached for the disambiguation process. If so, then as shown in 770, voice output indicating failure of the attempted parameter setting may be generated, streamed to the device, and played back on the device.

If the disambiguation process instead continues, then as shown in 780, voice output representing a request for disambiguation of the user-supplied parameter value may be generated, streamed to the device, and played back on the device. As shown in 710, voice input may be captured that represents another attempt to set the value of the parameter. Any of the operations shown in 710-780 may be performed additional times until a permissible value is specified for the parameter or until the disambiguation otherwise terminates.

Figure 8:
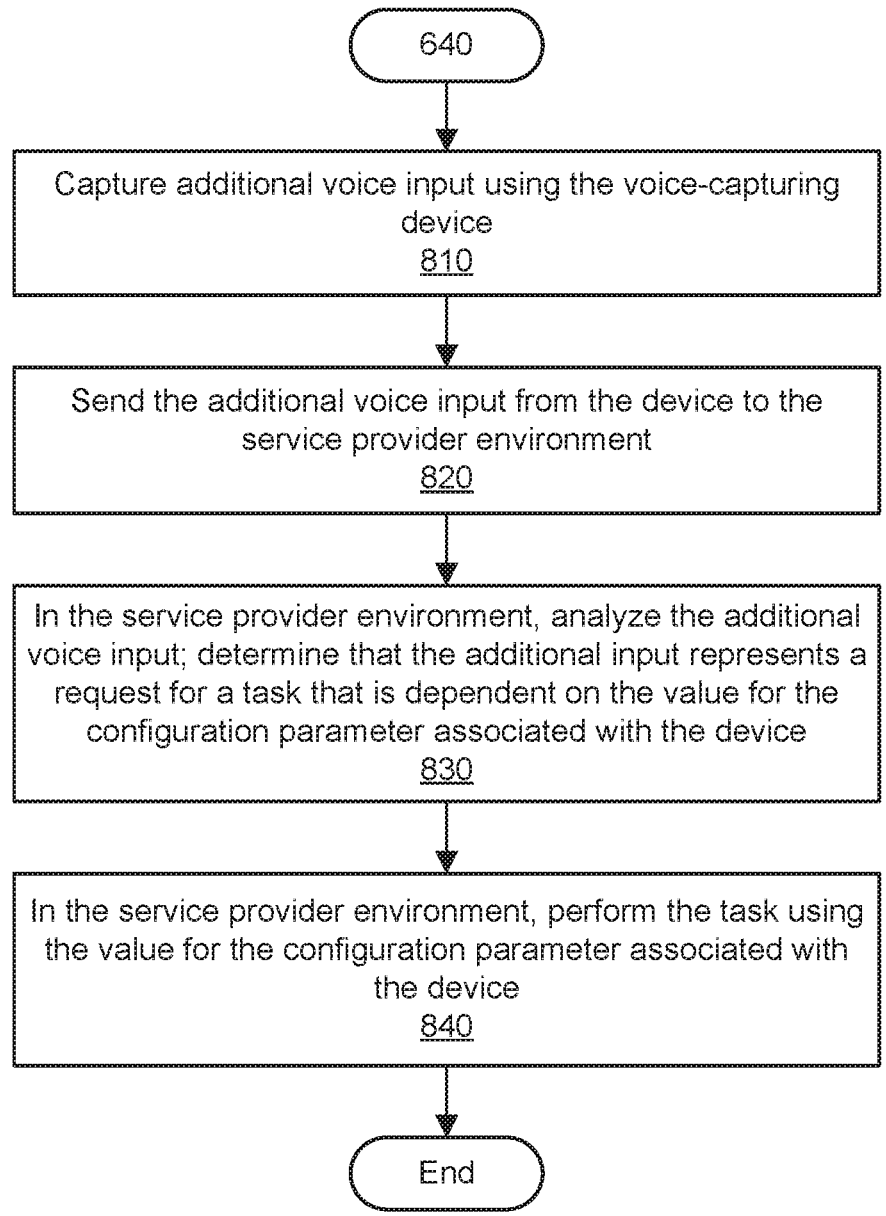
FIG. 8 is a flowchart illustrating further aspects of the method for voice-based parameter assignment for voice-capturing devices, including taking further action based (at least in part) on a value for a configuration parameter, according to one embodiment.

FIG. 8 is a flowchart illustrating further aspects of the method for voice-based parameter assignment for voice-capturing devices, including taking further action based (at least in part) on a value for a configuration parameter, according to one embodiment. The operations shown in FIG. 8 may be performed after the operations shown in FIG. 6 to specify and store the parameter value for the device. As shown in 810, additional voice input may be captured using the voice-capturing device. As shown in 820, the additional voice input may be sent from the device to the service provider environment. The additional voice input may be captured and sent to the service provider environment in a similar manner as discussed above with respect to FIG. 6.

As shown in 830, the additional voice input may be analyzed by one or more components of the service provider environment. The analysis may determine that the additional voice input represents a request for a task that is dependent on or associated with the previously stored value for the configuration parameter. As discussed above, the service provider environment may include services (referred to as skills) that implement tasks such as scheduling conference calls; identifying a speaker during a conference call; acting as a scheduling assistant; providing calendaring services; recording a meeting; accessing calendars, phone directories, or e-mail; creating, scheduling, and/or modifying tasks; and so on. In one embodiment, a set of skills that are accessible to a particular device (or to a class of devices, e.g., devices associated with a particular profile) may be identified by an administrator of an organization that owns or operates the device. The skills associated with a device may be selected from a set of predefined skills by user input to a management console or other management component.

As shown in 840, the requested task may be performed using the stored value for the parameter. The task may be performed (at least in part) within the service provider environment, e.g., using one or more skills. For example, a skill for joining a conference call may be performed based (at least in part) on the location of the device, e.g., by also determining any conference calls scheduled for the location. As another example, if the user invokes a room service skill in a hotel, the room service skill may generate an instruction to hotel staff that specifies the location of the device. As a further example, if the user invokes a skill to turn on or off the lights, the skill may be performed based (at least in part) on the location of the device. As yet another example, the user may ask for information regarding the device, including the stored parameter value. Based on these parameter-dependent skills, voice output may be generated, streamed to the device, and played back using the voice output playback. For example, the voice output may acknowledge the successful execution of the requested task and/or specify that the task was performed with reference to the specific value for the parameter.

Illustrative Computer System

In at least some embodiments, a computer system that implements a portion or all of one or more of the technologies described herein may include a computer system that includes or is configured to access one or more computer-readable media. FIG. 9 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices implementing one or more services in a service provider environment, wherein the one or more services implement voice input analysis and device management; and
   a voice-capturing device, wherein the voice-capturing device comprises at least one processor, a memory storing program instructions, and an audio input component, wherein the voice-capturing device is communicatively coupled to the one or more services over one or more networks, and wherein the program instructions are executable by the at least one processor to:
      capture voice input received from the audio input component of the voice-capturing device, wherein the voice input received from the audio input component includes a voiced location assignment of the voice-capturing device; and
      cause the voice-capturing device to send the captured voice input including the voiced location assignment of the voice-capturing device to the one or more computing devices in the service provider environment;
   wherein the one or more services are executable by the one or more computing devices to:
      determine, using the device management, a set of authorized values for a location parameter of the voice-capturing device;
      perform the voice input analysis for the captured voice input received from the voice-capturing device, wherein the voice input analysis determines a value for the location parameter of the voice-capturing device based on a representation of the voiced location assignment in the captured voice input, wherein the value comprises an identifier of a particular location of the voice-capturing device, wherein the value affects a use of the voice-capturing device with the service provider environment, and wherein the value for the location parameter is verified as an authorized value in the set of authorized values;

store, using the device management, an association between the voice-capturing device and the value for the location parameter; and determine and store, using the device management, an association between the voice-capturing device and a set of functions accessible to the voice-capturing device in the service provider environment, wherein the set of functions comprises one or more functions associated with the value for the location parameter.

2. The system as recited in claim 1, wherein the voice input is prompted by the one or more services based at least in part on prior voice input requesting at least one of the functions associated with the value for the location parameter.

3. The system as recited in claim 1, wherein the voice-capturing device is associated with an audio output component, and wherein the one or more services are further executable by the one or more computing devices to:

send voice output over the one or more networks from the service provider environment to the voice-capturing device, wherein the voice output represents a request for disambiguation of a user-supplied value for the location parameter; and cause the voice output to be played via the audio output component.

4. The system as recited in claim 1, wherein the voice-capturing device is associated with an audio output component, and wherein the one or more services are further executable by the one or more computing devices to:

receive additional voice input from the voice-capturing device, wherein the additional voice input is received over the one or more networks at the service provider environment;

perform the voice input analysis for the additional voice input, wherein the voice input analysis for the additional voice input determines that the additional voice input represents a command seeking information descriptive of the voice-capturing device;

generate voice output responsive to the additional voice input, wherein the voice output is sent over the one or more networks from the service provider environment to the voice-capturing device, and wherein the voice output represents a recitation of the value for the location parameter; and cause the voice output to be played via the audio output component.

5. A computer-implemented method, comprising:

receiving voice input from an audio component of a voice-capturing device, wherein the voice input is received over one or more networks at one or more computing devices in a service provider environment comprising one or more services implementing voice input analysis and device management, and where the voice input received from the audio input component of the voice-capturing device includes a voiced location assignment of the voice-capturing device;

performing the voice input analysis for the voice input received from the voice-capturing device, wherein the voice input analysis determines a value for a location parameter of the voice-capturing device based on a representation of the voiced location assignment in the received voice input, wherein the value is descriptive of the voice-capturing device; and storing an association between the voice-capturing device and the value for the location parameter, wherein the association is stored in the service provider environment using the device management, and wherein the value affects one or more actions taken by the service provider environment responsive to further voice input from the voice-capturing.

6. The method as recited in claim 5, wherein the location parameter comprises a location of the voice-capturing device, and wherein the value for the location parameter comprises an identifier of a particular location.

7. The method as recited in claim 5, further comprising:

determining, using the device management, a set of authorized values for the location parameter; and verifying, using the device management, that the value for the location parameter is in the set of authorized values.

8. The method as recited in claim 5, wherein the voice-capturing device is associated with an audio output component, and wherein the method further comprises:

sending voice output over the one or more networks from the service provider environment to the voice-capturing device, wherein the voice output represents a request for disambiguation of a user-supplied value for the location parameter; and causing the voice output to be played via the audio output component.

9. The method as recited in claim 5, wherein the voice-capturing device is associated with an audio output component, and wherein the method further comprises:

receiving additional voice input from the voice-capturing device, wherein the additional voice input is received over the one or more networks at the service provider environment;

performing the voice input analysis for the additional voice input, wherein the voice input analysis for the additional voice input determines that the additional voice input represents a request for information descriptive of the voice-capturing device;

generating voice output responsive to the additional voice input, wherein the voice output is sent over the one or more networks from the service provider environment to the voice-capturing device, and wherein the voice output represents a recitation of the value for the location parameter; and causing the voice output to be played via the audio output component.

10. The method as recited in claim 5, wherein the voice-capturing device is associated with an audio output component, and wherein the method further comprises:

receiving additional voice input from the voice-capturing device, wherein the additional voice input is received over the one or more networks at the service provider environment;

performing the voice input analysis for the additional voice input, wherein the voice input analysis for the additional voice input determines that the additional voice input represents a request for information descriptive of the voice-capturing device;

generating voice output responsive to the additional voice input, wherein the voice output is sent over the one or more networks from the service provider environment to the voice-capturing device, and wherein the voice output represents a recitation of the value for the location parameter and one or more values for one or more additional location parameters descriptive of the voice-capturing device; and causing the voice output to be played via the audio output component.

11. The method as recited in claim 5, wherein the voice-capturing device is associated with an audio output component, and wherein the method further comprises, prior to receiving the voice input:
receiving initial voice input from the voice-capturing device, wherein the initial voice input is received over the one or more networks at the service provider environment;
performing the voice input analysis for the initial voice input, wherein the voice input analysis for the initial voice input determines that the initial voice input represents a request for a function associated with the location parameter;
generating voice output responsive to the initial voice input, wherein the voice output is sent over the one or more networks from the service provider environment to the voice-capturing device, and wherein the voice output represents a request for the value for the location parameter; and
causing the voice output to be played via the audio output component.

12. The method as recited in claim 5, wherein the voice-capturing device is associated with an audio output component, and wherein the method further comprises:
generating voice output responsive to the voice input, wherein the voice output is sent over the one or more networks from the service provider environment to the voice-capturing device; and
causing the voice output to be played via the audio output component.

13. The method as recited in claim 5, further comprising:
invoking an additional service in the service provider environment based at least in part on the further voice input, wherein the additional service performs the one or more actions based at least in part on the value for the location parameter.

14. The method as recited in claim 5, wherein the voice input is prompted by the one or more services based at least in part on prior voice input requesting a function associated with the value for the location parameter.

15. The method as recited in claim 5, wherein the association between the voice-capturing device and the value for the location parameter is stored based at least in part on authorization of a user of the voice-capturing device to specify the value for the location parameter.

16. The method as recited in claim 5, further comprising:
determining and storing, using the device management, an association between the voice-capturing device and a set of services accessible to the voice-capturing device in the service provider environment, wherein the set of services comprises one or more services associated with the value for the location parameter.

17. A non-transitory computer-readable storage medium storing program instructions computer-executable to perform:
receiving voice input from an audio input component of a voice-capturing device, wherein the voice input is received over one or more networks at one or more computing devices in a service provider environment comprising a voice input analysis service and a device management service, and wherein the voice input received from the audio input component of the voice-capturing device includes a voiced location assignment of the voice-capturing device;
performing analysis of the voice input received from the voice-capturing device using the voice input analysis service, wherein the analysis determines a location value for a location parameter of the voice-capturing device based on a representation of the voiced location assignment in the received voice input; and
storing an association between the voice-capturing device and the location value for the location parameter, wherein the association is stored by the device management service, and wherein the location value affects one or more actions taken by the service provider environment responsive to further voice input from the voice-capturing device.

18. The non-transitory computer-readable storage medium as recited in claim 17, wherein the program instructions are further computer-executable to perform:
sending voice output over the one or more networks from the service provider environment to the voice-capturing device, wherein the voice output represents a request for disambiguation of a user-supplied value for the location parameter; and
causing the voice output to be played via an audio output component associated with the voice-capturing device.

19. The non-transitory computer-readable storage medium as recited in claim 17, wherein the program instructions are further computer-executable to perform:
receiving additional voice input from the voice-capturing device, wherein the additional voice input is received over the one or more networks at the service provider environment;
performing analysis of the additional voice input using the voice input analysis service, wherein the analysis of the additional voice input determines that the additional voice input represents a request for information descriptive of the voice-capturing device;
generating voice output responsive to the additional voice input, wherein the voice output is sent over the one or more networks from the service provider environment to the voice-capturing device, and wherein the voice output represents a recitation of the location value for the location parameter; and
causing the voice output to be played via an audio output component associated with the voice-capturing device.

20. The non-transitory computer-readable storage medium as recited in claim 17, wherein the program instructions are further computer-executable to perform:
invoking an additional service in the service provider environment based at least in part on the further voice input from the voice-capturing device, wherein the additional service is indicated as being accessible to the voice-capturing device by the device management service, and wherein the additional service performs the one or more actions based at least in part on the location value for the location parameter.

* * * * *